United States Patent [19]
Urlacher et al.

[11] Patent Number: 4,621,487
[45] Date of Patent: Nov. 11, 1986

[54] HAYING MACHINES FOR FACILITATING TRANSPORT THEREOF

[75] Inventors: Jean-Pierre Urlacher; Denis Lang, both of Saverne, France

[73] Assignee: Kuhn S.A., Saverne, France

[21] Appl. No.: 821,014

[22] Filed: Jan. 21, 1986

Related U.S. Application Data

[63] Continuation of Ser. No. 622,531, Jun. 20, 1984, abandoned.

[30] Foreign Application Priority Data

Jul. 7, 1983 [FR] France .................................. 83 11485

[51] Int. Cl.⁴ ............................................. A01D 77/00
[52] U.S. Cl. ........................................ 56/228; 56/370; 280/415 R; 172/244
[58] Field of Search ................... 56/370, 228, DIG. 1, 56/218; 280/415 R, 415 B, 415 A; 172/240, 241, 244, 625

[56] References Cited

U.S. PATENT DOCUMENTS

| | | | |
|---|---|---|---|
| 1,837,056 | 12/1931 | Meier | 56/228 |
| 3,754,383 | 8/1973 | Burrough et al. | 56/DIG. 1 |
| 4,119,329 | 10/1978 | Smith | 280/415 R |
| 4,395,868 | 8/1983 | Kaetzel | 56/370 |

*Primary Examiner*—Gene Mancene
*Assistant Examiner*—David I. Tarnoff
*Attorney, Agent, or Firm*—Marmorek, Guttman & Rubenstein

[57] ABSTRACT

In a haying machine, a chassis, a plurality of rotors mounted side-by-side on the chassis for displacing plants on the ground, a shaft pivoted to the chassis for coupling the chassis to a pulling vehicle, a retractable support, wheels mounted on said support for carrying the machine during transportation thereof, and which are positioned substantially level with the chassis when the machine operates; and a hydraulic jack for simultaneously displacing the chassis with respect to the shaft and the retractable support with respect to the chassis.

6 Claims, 13 Drawing Figures

HAYING MACHINES FOR FACILITATING TRANSPORT THEREOF

This is a continuation of application Ser. No. 622,531, filed June 20, 1984, now abandoned.

This invention refers to haying machines comprising in particular a chassis bearing several rotors placed side-by-side and moving cut plants lying on the ground and a shaft for coupling to a tractor, this shaft being pivoted with relation to said chassis.

These machines are in general too large to be moved as they are on roads or trails. For this reason they are generally moved lengthwise. However, this change in position requires various maneuvers to place the chassis within the extension of the tractor and to free the rotors from the ground. Moreover, these machines are not very stable on rough terrain and in turns.

The present invention in particular has for object to facilitate the change in position of the machine from a work position to a transport position and, inversely, to confer a suitable stability to the machine during transport.

To this effect, a characteristic of the invention consists in that a retractable support equipped with wheels is connected to the chassis, which wheels are substantially parallel to the chassis and are placed on both sides of the said chassis and of the rotors.

Owing to the support, the wheels are height-adjustable. In operation, they can be freed upwardly in order not to interfere with the displacement of cut grass. During transport, they are in contact with the soil and lift the machine.

Owing to their orientation, these wheels are immediately positioned for lengthwise motion. Moreover, their gage can be substantially wide in order to confer suitable stability to the machine.

According to another characteristic of the invention, the machine comprises a hydraulic jack simultaneously moving the support and the aforementioned wheels and the chassis of the machine with respect to the shaft, in order to bring it within the extension of the tractor. All necessary maneuvers required to change the position of the machine are thus realized in a minimum period of time and without efforts on the part of the operator.

Other characteristics and advantages of the invention will appear from the following description, reference being had to the accompanying drawings which represent by way of non-limiting examples two embodiments of the invention.

As shown on FIGS. 1 to 4, the machine according to the invention comprises five rotors consisting of drums 2 to 6 connected mutually by means of a chassis 7. This chassis is constituted by five housing 8 to 12 each surmounting a drum 2 to 6 and four tubes 13 to 16 connecting said housings with one another.

This chassis 7 is connected to a pulling tractor 17 by means of a shaft 18.

Figure 7:
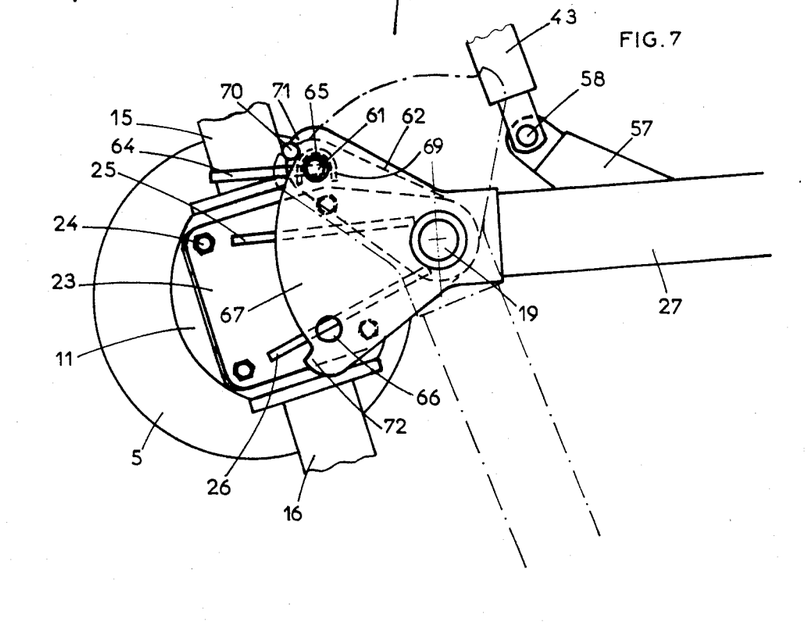
FIG. 7 shows on a larger scale a top plan view of the locking device between the chassis and the shaft.
Figure 8:
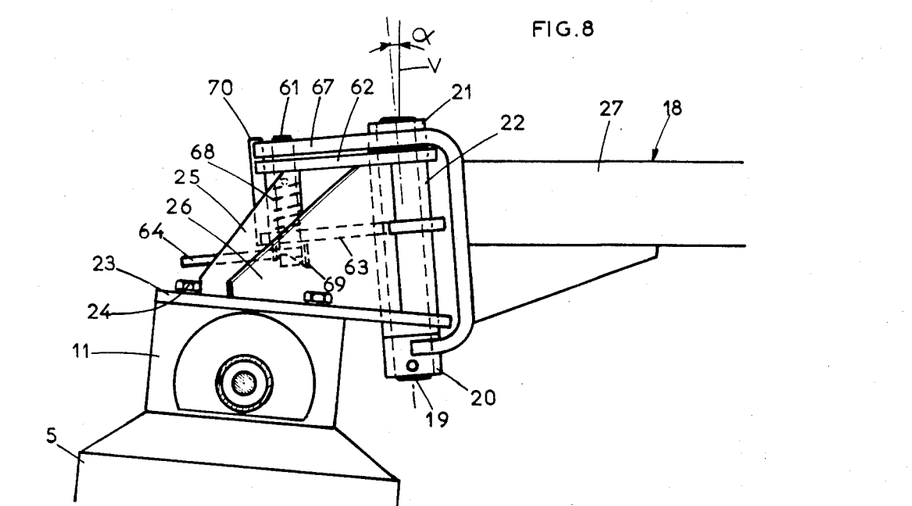
FIG. 8 shows a side view of the device according to FIG. 7.
Figure 9:
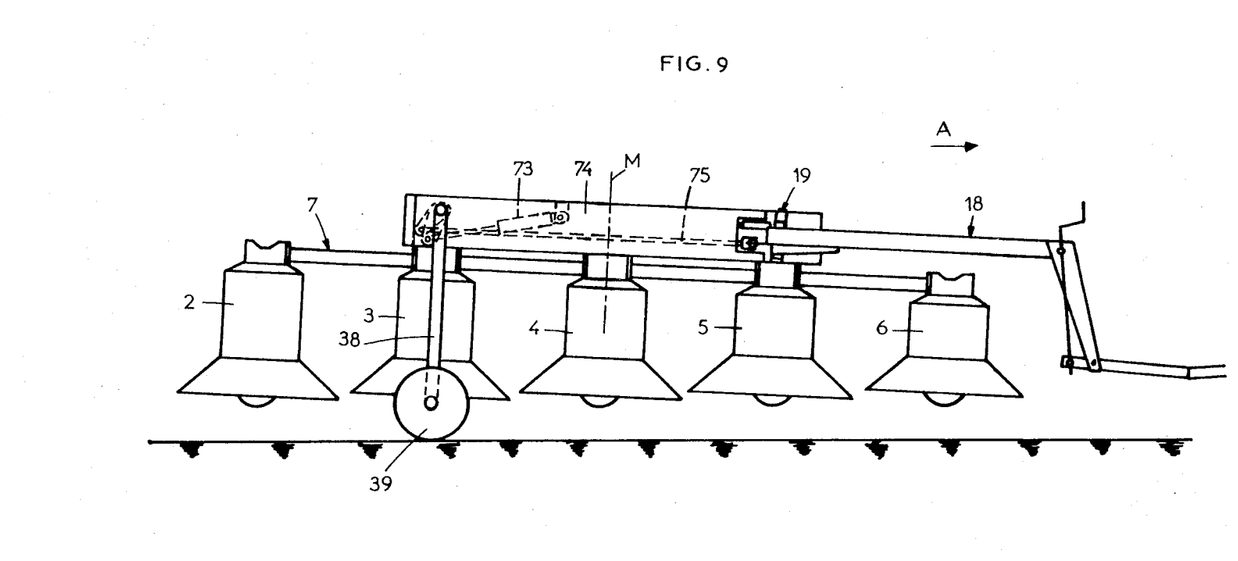
FIG. 9 shows a side view of another embodiment.

As it appears clearly from FIGS. 7 and 8, this shaft is pivoted to chassis 7 by the intermediary of an axle 19. The latter is housed in two shells 20 and 21 integral with shaft 18 and a tube 22 integral with a plate 23 fixed to housing 11 of chassis 7 by means of screw 24. The connection between the tube 22 and the plate 23 is reinforced by means of two vertical plates 25 and 26.

Shaft 18 is comprised of two parts 27 and 28 pivoted one with respect to the other by means of an axle 30. They are moreover connected by a threaded crank 31. The latter makes it possible to modify the relative position between the two parts 27 and 28. Part 28 comprises at its front end a hooking plate 29.

Each drum 2 to 6 is rotationally guided on a central support shaft which is not shown. The upper ends of these shafts are fixed in the housings 8 to 12 of the chassis 7 while their lower ends bear a wheel or roller 32 allowing the machine to move on the ground during operation. Each of these drums 2 to 6 carry at its lower end a flexible skirt 33 to 37 which picks up and moves onto its upper surface cut grass lying on the ground. On the walls of these drums can be provided in manner known per se entraining means facilitating said displacement.

Figure 1:
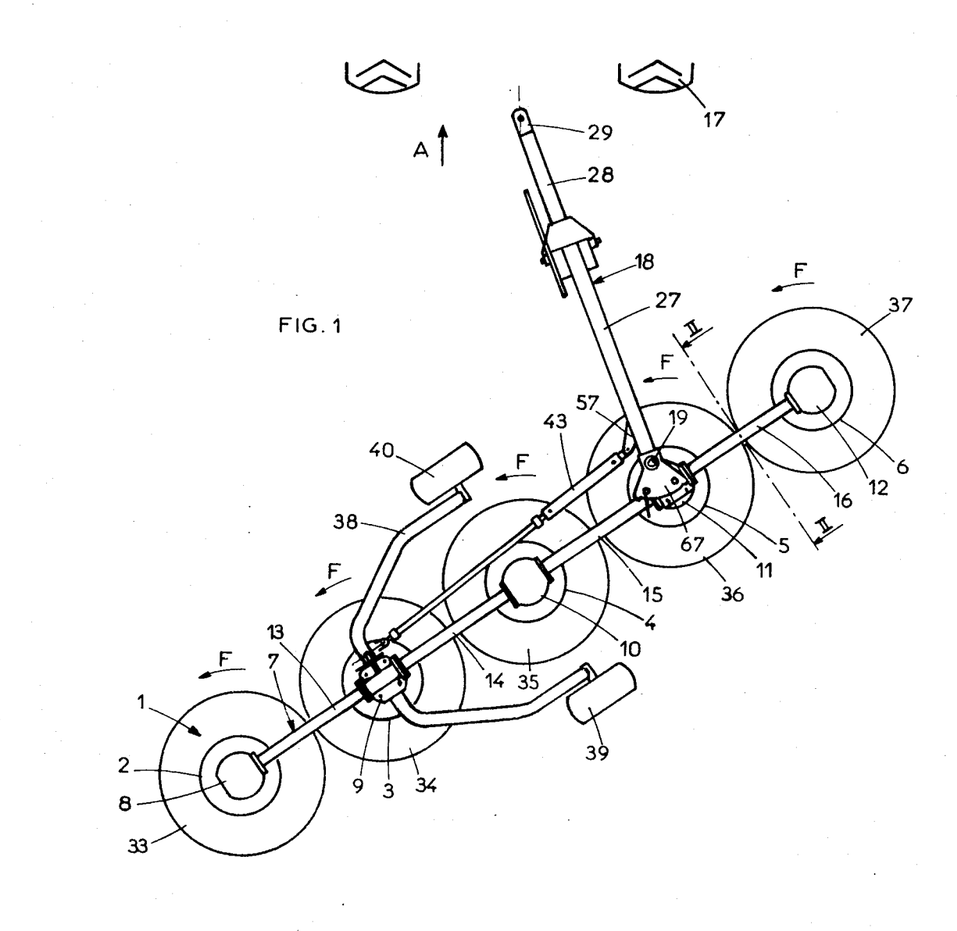
FIG. 1 represents a top plan view of the machine according to the invention in work position.

As is shown in FIG. 1, in operation, the chassis 7 is disposed transversally relative to the direction of advance indicated by the arrow A. Drums 2 to 6 are driven in the direction of the arrows F around their supporting shafts in manner known per se from the power shaft of the tractor. This rotation of drums 2 to 6 is assured by means of a shaft house in chassis 7, which shaft is equipped with pinions which mesh with typped wheels integral with said drums. These pinions and wheels are housed in housings 8 to 12. Besides, the drums 2 to 6 are slightly forwardly inclined in order to ensure proper contact of skirts 33 to 37 with the ground in the forward part of their trajectories. This inclination is adjustable by means of threaded crank 31. Cut grass once picked up is then moved from one drum to the other in order to form a lateral hay row.

Figure 2:
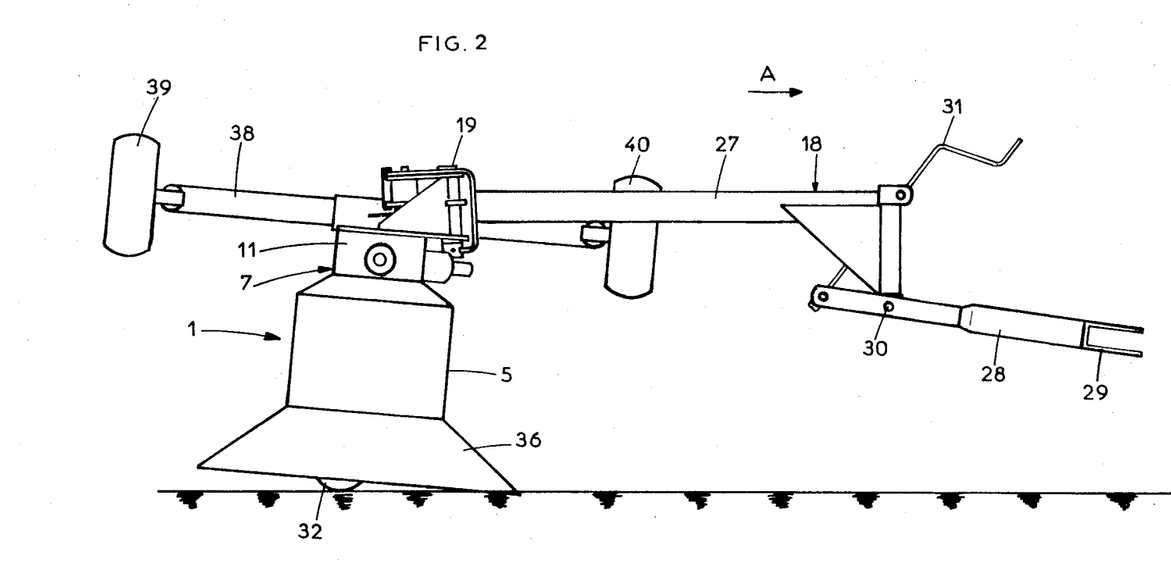
FIG. 2 shows on a larger scale a cross-section along line II—II of FIG. 1.

In conformity with the invention, a retractable support 38 equipped with wheels 39 and 40 is connected to chassis 7. These wheels 39 and 40 are substantially parallel to chassis 7 and are placed on both sides of the latter and on drums 2 to 6. Support 38 is rotationally guided in a bushing 41 fixed to housing 9 of chassis 7. This fastening is effected by screws 42. Wheels 39 and 40 can be height-adjusted by means of support 38. This movement makes it possible to lift chassis 7 with drums 2 to 6 in order to facilitate transport or to free wheels 39 and 40 upwardly in work position (FIGS. 1 and 2). In this work position, the wheels 39 and 40 are located substantially level with chassis 7. They do not interfere with the displacement of the cut grass. Owing to the previously mentioned orientation of these wheels 39 and 40 relative to chassis 7, they are immediately positioned for lengthwise transport when they are lowered.

Support 38 is substantially in the shape of an inverted U passing above chassis 7. Wheels 39 and 40 thus can have a very wide gage, that is to say much greater than the trajectory of skirts 33 to 37, which gives good stability to the machine during transport.

The said height-adjustment of wheels 39 and 40 takes place by pivoting the support 38 by an angle of about 90° by means of a hydraulic jack 43. This support 38 can be stopped in work position or in transport position by means of a locking device shown in detail on FIGS. 5 and 6. This device comprises a locking pin 44 with handle 45. It is guided in two legs 46 and 47 integral with chassis 7 and can engage in two holes 48 and 49 of a sector 50 integral with support 38. These holes 48 and 49 correspond to the work position and to the transport position, respectively. They are brought in front of lock 44 as a result of the pivoting of support 38. Lock 44 is pushed into holes 48 and 49 by a spring 51 which surrounds it along part of its length and bears on one side on leg 46 and from the other side against stop washer 52 connected to said locking pin. Leg 46 is formed with a ramp 53 which makes it possible to withdraw the locking pin from holes 48 and 49 by making it turn on itself. This ramp 53 makes it possible also to maintain it in unlocked position.

Figure 5:
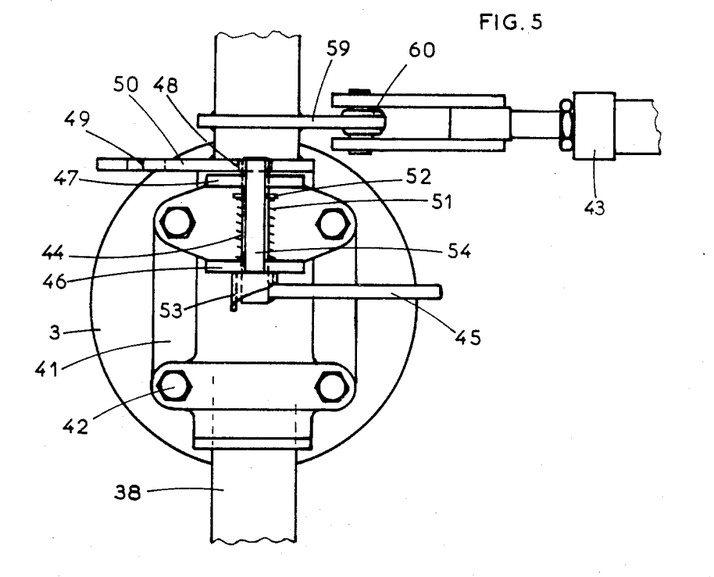
FIG. 5 shows on a larger scale a top plan view of the locking device for the support of the transport wheels.
Figure 6:
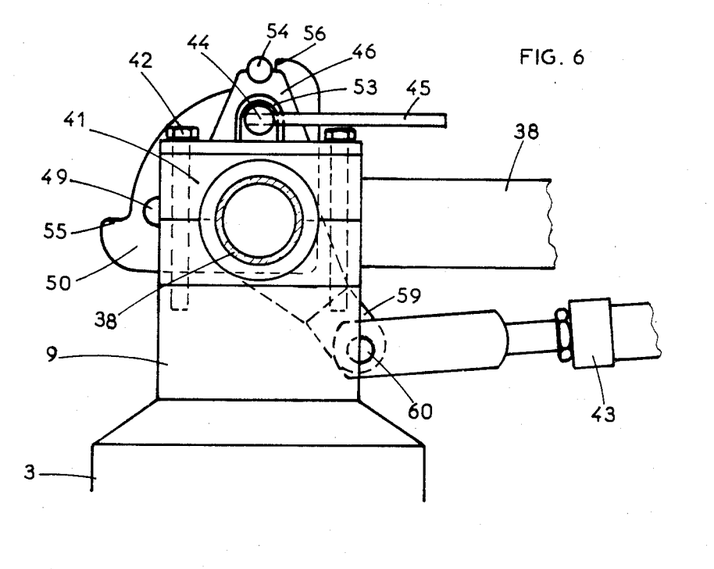
FIG. 6 shows a side view of the device according to FIG. 5.

The two legs 46 and 47 comprise, in addition, a stop 54 which limits the pivoting of support 38 as soon as the work position or the transport position is reached. To that effect, sector 50 comprises two stops 55 and 56 which block support 38 as soon as they come into contact with said stop 54.

Figure 3:
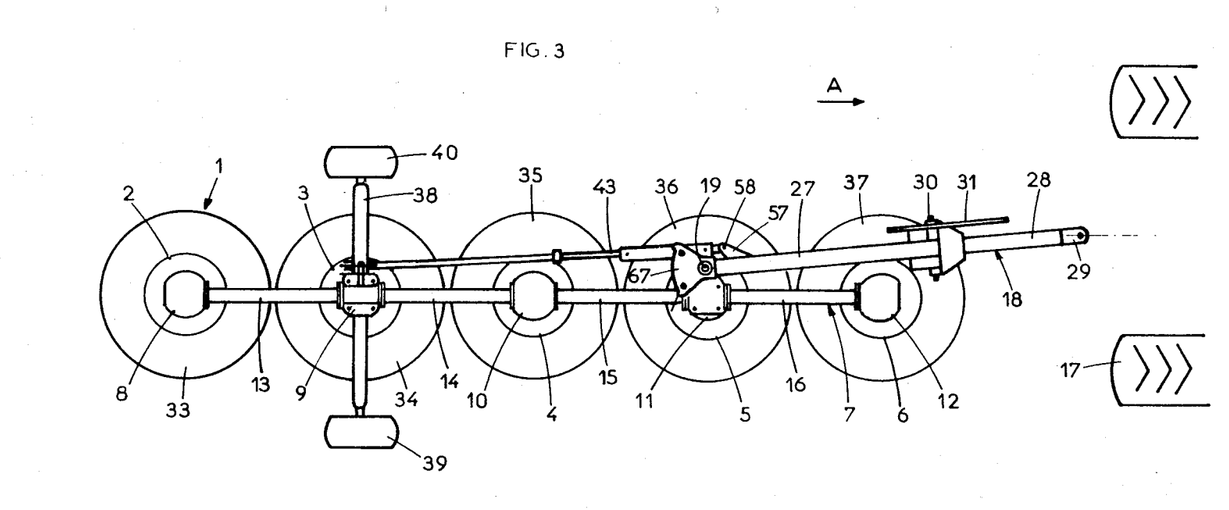
FIG. 3 shows a top plan view of the machine in transport position.
Figure 4:
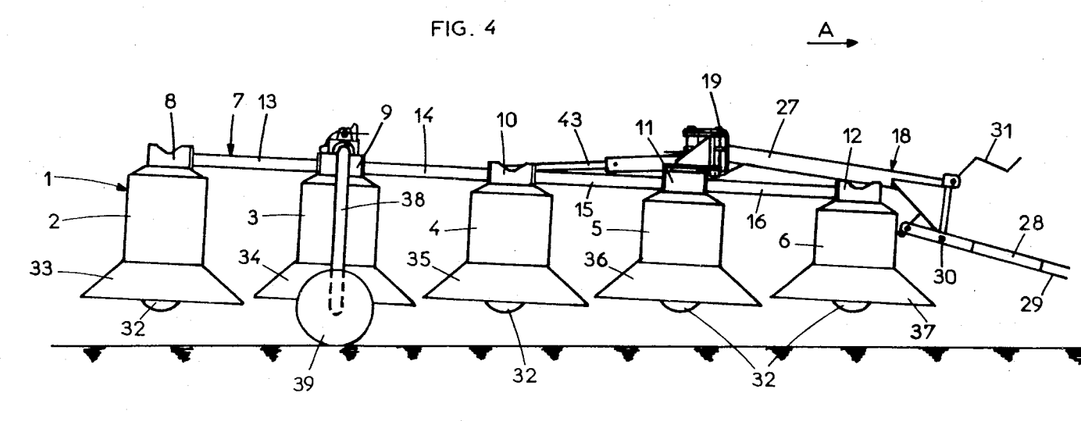
FIG. 4 shows a side view of the machine in transport position.

In the transport position which is represented on FIGS. 3 and 4, chassis 7 is located substantially in the extension of tractor 17. This position is obtained by pivoting chassis 7 around the pivoting axis 19 with shaft 18. The said shaft 19 is slightly rearwardly inclined as seen from the direction of advance A. It forms an angle α of about 10° to 15° relative to the vertical (V). Owing to this inclination, the front part of chassis 7 rises and drums 2 to 6 straighten while pivoting from the work position to the transport position. Thus, the distance relative to the ground of skirts 33 to 37 and of the rollers or wheels 32 is sufficient to avoid that these elements touch the ground during transport. The machine then rests completely on wheels 39 and 40 of support 38 and on tractor 17 through shaft 18. It is understood that shaft 18 remains hooked to the tractor during these operations.

According to an important characteristic of the invention, the hydraulic jack 43 simultaneously moves the chassis 7 around its pivoting axis 19 with shaft 18 and support 38 together with wheels 39 and 40 with respect to said chassis. This jack has a double action in order to be able to exert a push on chassis 7 and on support 38 during transport in the transport position and a traction on these same members during transfer to work position. In the example shown in FIGS. 1 to 8, the said hydraulic jack is pivoted on a leg 57 integral with shaft 18 by means of an axle 58 and a leg 59 integral with support 38 by means of a washer 60. This washer 60 enables the height-adjustment of chassis 7 as well as the straightening of drums 2 to 7 during pivoting to transport position. The hydraulic jack 43 can be actuated from the hydraulic take-off of tractor 17.

Chassis 7 can be locked with relation to shaft 18 in each of the previously mentioned positions by means of a lock 61 (see FIGS. 7 and 8). The latter is guided in two parallel plates 62 and 63 connected to tube 22 integral with plate 23 which is fixed to chassis 7. It comprises a handle 64 and can be engaged in two holes 65 and 66 of a sector 67 integral with shaft 18. These holes 65 and 66 correspond one to the work position (position shown in dashes on FIG. 7) and the other to the transport position (position shown in dots and dashes on this FIG. 7). Each hole 65 or 66 faces lock 61 once chassis 7 is brought into the position that it occupies with respect to shaft 18 during work or transport. Lock 61 is maintained in locking position by means of a spring 68. The latter surrounds the lock and exerts thereon a pressure towards holes 65 or 66. Plate 63 comprises a ramp 69 which facilitates the withdrawal of lock 61 from holes 65 and 66. This withdrawal is obtained by turning lock 61 on itself in order to cause its handle 64 to glide on this ramp 69. This ramp 69 also makes possible maintaining lock 61 in unlocked position.

The two previously mentioned plates 62 and 63 comprise a stop 70 which limits the rotation of chassis 7 with respect to shaft 18. To this effect, sector 67 comprises two stops 71 and 72 against which stop 70 immobilizes when the desired position is reached. Lock 61 can be engaged in the desired hole 65 or 66 of sector 67. To bring lock 61 in a locking position, it is sufficient to make a turn on itself in order to bring handle 64 down on ramp 69.

In the following description of the example according to FIGS. 9 to 13, the same reference characters describe the same parts or features as in the previous example.

In this example, a double-acting hydraulic jack 73 is connected to support 38 of wheels 39 and 40 and to a beam 74 substantially parallel to chassis 7. The said support 38 and shaft 18 are pivoted on this beam 74. Moreover, support 38 of wheels 39 and 40 is connected to shaft 18 by means of a rod 75. Thus, when the jack 73 is operated, it pivots support 38 of wheels 39 and 40 to bring the latter into work position or into transport position. The said pivoting of support 38 immediately rotates chassis 7 with beam 74 around the pivoting axis 19 with shaft 18 and also brings it into work position or into transport position.

Owing to this arrangement, there is practically no strain on chassis 7 when changing from one position to the other. Moreover, it is possible to use a jack 73 which is substantially shorter than in the previous example. Finally, beam 74 rigidifies chassis 7.

The said beam 74 is positioned above chassis 7 and is connected thereto by means of screw 76. It appears from FIG. 9 that it is positioned substantially symmetrically relative to the median plane (M) of chassis 7. It is made in two parts 77 and 78 which are assembled either by welding or by means of bolts. The interior of beam 74 is hollow. Hydraulic jack 73 and rod 75 advantageously are housing in said beam. The latter thus ensures their protection against shocks, twisted hay, dust and rain.

Figure 10:
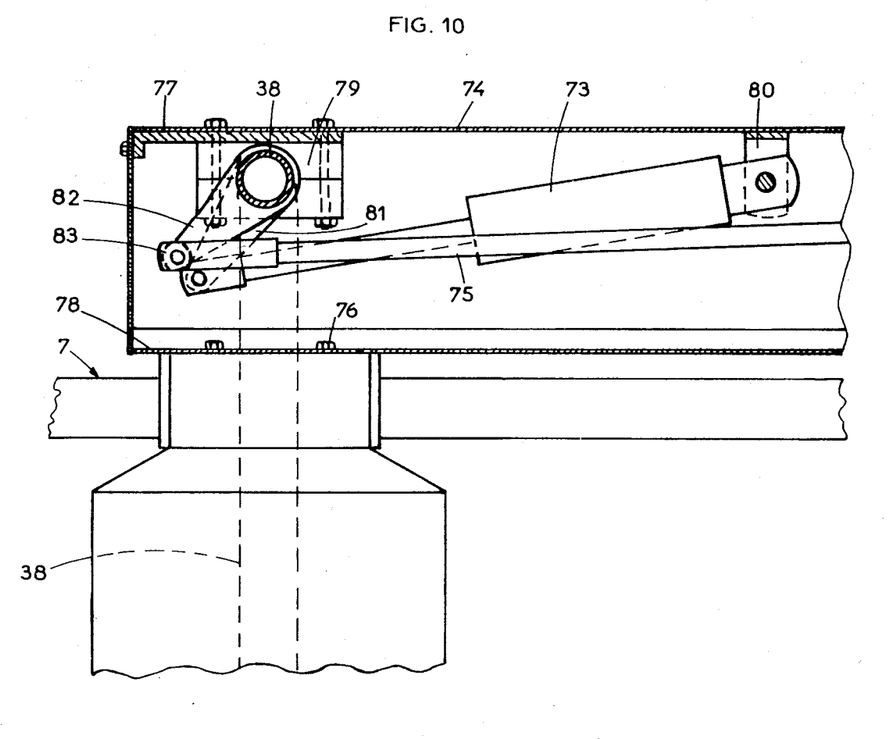
FIG. 10 shows on a larger scale a partial cross-section at the level of the pivot of the support equipped with transport wheels.
Figure 11:
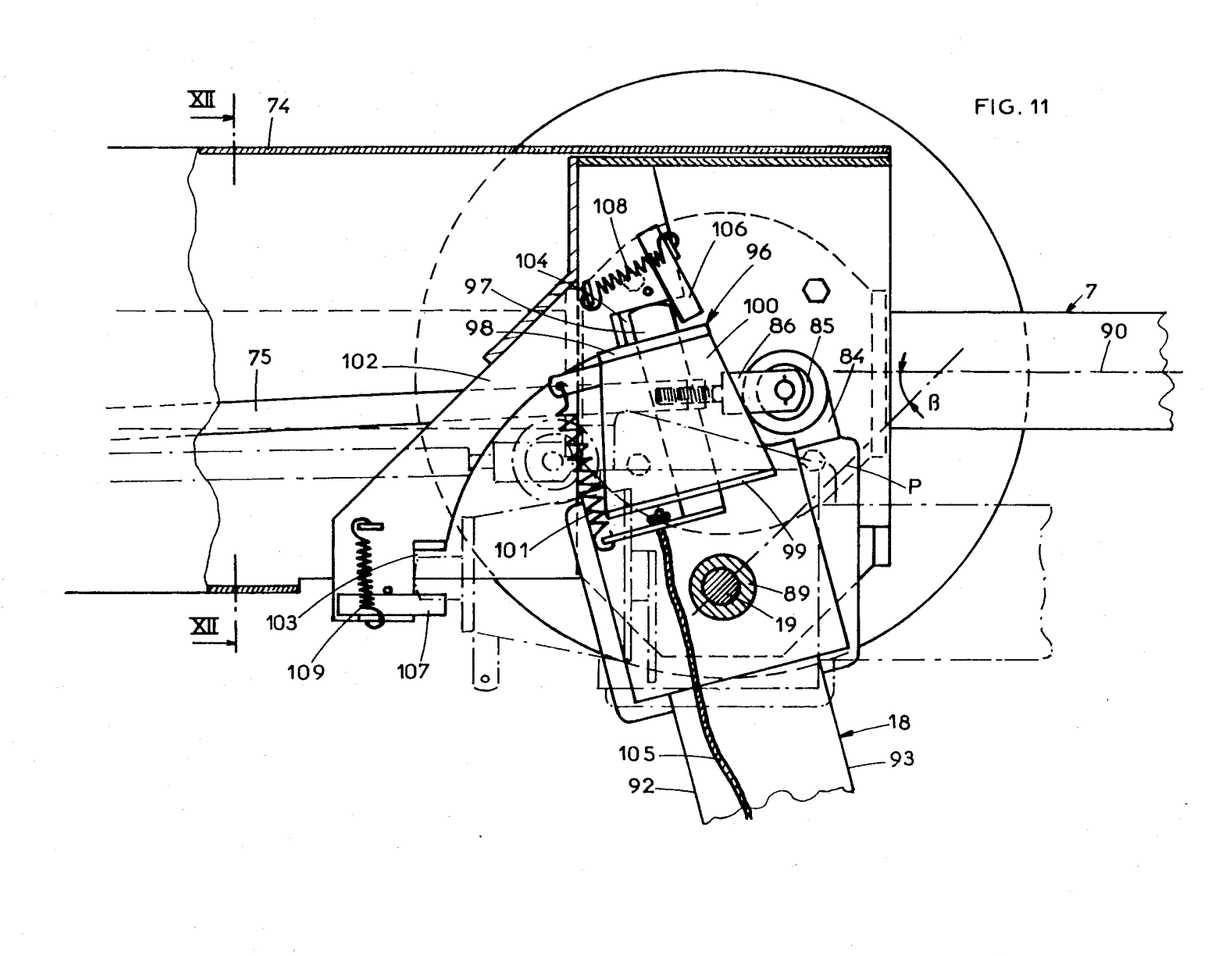
FIG. 11 shows on a larger scale and in partial cross-section a top plan view of the pivot between the shaft and the chassis of the machine.
Figure 12:
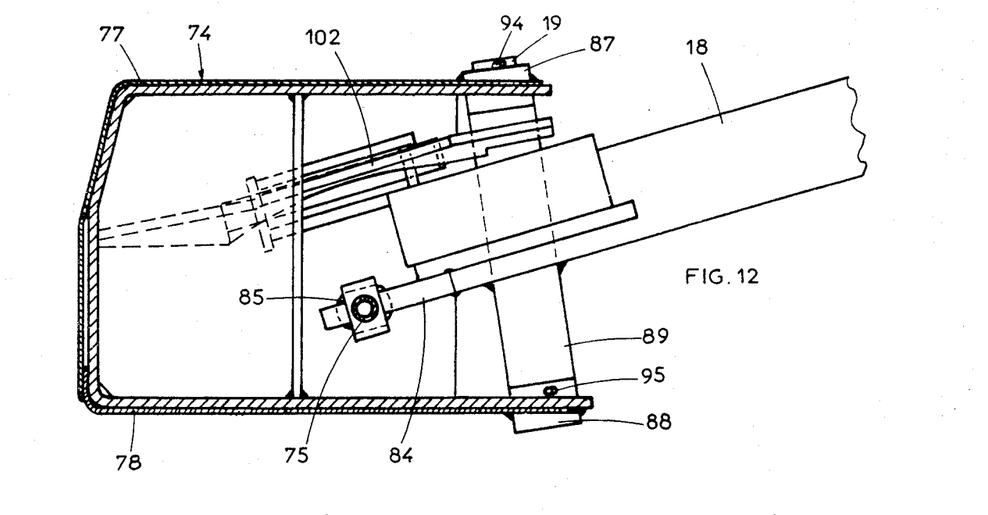
FIG. 12 shows a cross-section taken along lines XII—XII of FIG. 11.
Figure 13:
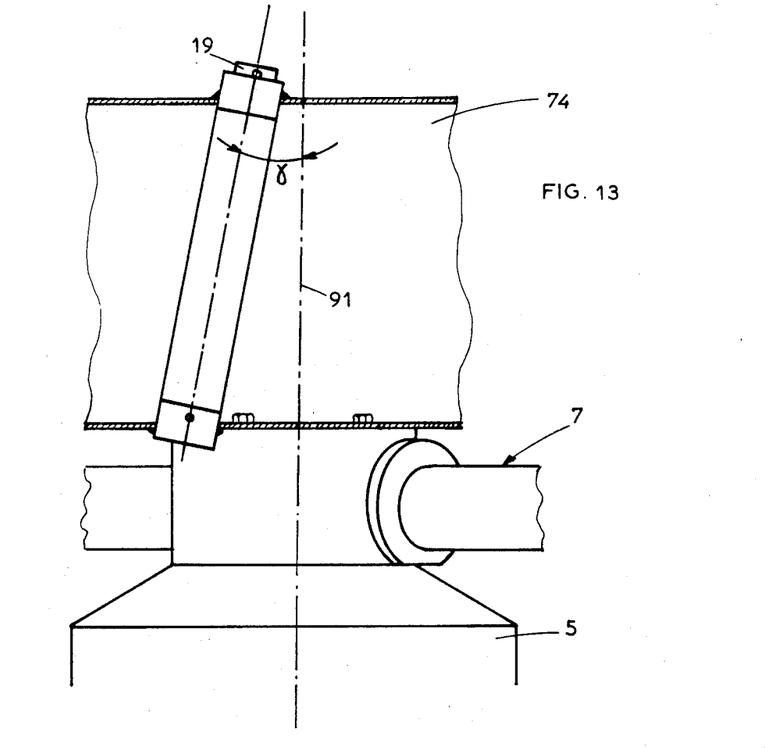
FIG. 13 shows schematically the position of the pivoting axis of the shaft.

It is seen in the FIG. 10 that support 38 for wheels 39 and 40 is housed in bushings 79 fixed to beam 74. One of the ends of hydraulic jack 73 is connected to a clasp 80 integral with beam 74 while its other end is connected to a flat 81 integral with support 38. Rod 75 is connected to a second flat 82 of support 38 by means of a swivel joint 83. Its other extremity is connected to a plate 84 integral with the rear part of shaft 18 by means of a swivel joint 85 (see FIG. 11). This extremity of rod 75 is constituted by a cap 86 which is screwed on the other part of said rod. This makes it possible to adjust the length of rod 75 in proportion to the exact distance between plate 84 of shaft 18 and support 38 of wheels 39 and 40.

Shaft 18 is pivoted on the beam by means of a pin 19. This pin 19 is guided between two shells 87 and 88 soldered on beam 74 and passes to a sheet 89 integral with shaft 18. This assembly is clearly shown in FIGS. 11 to 13. This pin 19 is besides inclined in plane P forming an angle $\beta$ of about 45° with a longitudinal axis 90 of beam 74. In this plane (P), pin 19 forms an angle $\gamma$ of about 11° with respect to the geometrical axis 91 which is parallel to the axes of rotation (not shown) of drums 2 to 6 (see FIG. 13). This inclination makes it possible to vary the distance from the soil of drums 2 to 6 and also their inclination when passing from work position to transport position, or vice-versa, while retaining the sides 92 and 93 of shaft 18 practically vertical in each of said positions. The pivoting pin 19 is positioned by means of washers 94 and 95.

This embodiment requires only one locking device 96 in order to simultaneously stop support 38 of wheels 39 and 40 and chassis 7 together with beam 74 with respect to shaft 18 in work or transport positions. This device comprises a lock 97 which can slide longitudinally into supports 98 and 99 integral with shaft 18 and connected mutually by means of a plate 100. It is maintained in locking position by a spring 101. In beam 74 there is provided a sector 102, provided with two notches 103 and 104 in which penetrates said lock and of which one corresponds to the work position (position represented in dashes on FIG. 11) and the other to the transport position (position shown in dots and dashes on this FIG. 11).

To pass from one position to the other, lock 97 must be withdrawn from notch 103 or 104 in which it is, by pulling it against the force of spring 101. This traction can advantageously be carried out from the pulling tractor by means of cable 105.

As soon as lock 97 is free from notch 103 or 104, a stop 106 or 107 pivoted on sector 102 places itself against its front end under the urging of a spring 108 or 109. This stop 106 or 107 prevents its immediate return into notch 103 or 104.

It is sufficient then to actuate hydraulic jack 73 to modify the position of the machine. In its new position, lock 97 laterally frees stop 106 or 107 by means of its side and engages automatically itself in notch 103 or 104 which corresponds to the new position of the machine.

It is evident that there can be brought to the embodiments above described various improvements, modifications or additions and that various elements can be replaced by equivalent elements without thereby departing from the scope of the present invention.

We claim:

1. A haymaking machine convertible between an operating and a transporting position comprising:
   a chassis,
   a plurality of rotors mounted side-by-side on said chassis for displacing plants on the ground,
   a beam mounted above said chassis,
   a shaft pivoted to said beam for coupling the machine to a pulling vehicle,
   a retractable support mounted on said beam,
   wheels mounted on said support for carrying said machine when in the transporting position, said wheels being movable to a position in which they are substantially level with said chassis when said machine is in the operating position,
   a rod connecting said retractable support to said shaft,
   a hydraulic jack, one end of said hydraulic jack being connected to said beam and the other end of said hydraulic jack being connected to said retractable support,
   and a single locking device arranged to stop both said retractable support and said chassis with respect to said shaft in operative position or in transport position of said machine,
   whereby upon actuation of said hydraulic jack, said hydraulic jack displaces said chassis with respect to said shaft and said retractable support with respect to said chassis.

2. Machine as defined in claim 1, wherein said beam is positioned practically symmetrically with respect to the middle plane of said chassis.

3. Machine as defined in claim 1, wherein said beam is hollow and wherein said hydraulic jack and said rod are housed in said beam.

4. Machine as defined in claim 1, wherein said rod is adjustable in length.

5. Machine as defined in claim 1, wherein said rod has a swivel joint at each end.

6. Machine as defined in claim 1, wherein the pivoting axis between said shaft and said beam is angularly inclined with respect to a geometrical axis parallel to the axes of rotation of said drums along a plane forming an angle with the longitudinal axis of said beam.

* * * * *